(12) United States Patent
Mitchell

(10) Patent No.: US 6,345,127 B1
(45) Date of Patent: Feb. 5, 2002

(54) VIDEO DATA COMPRESSION PREPROCESSOR USING HOLOGRAPHIC OPTICAL CORRELATION AND FEEDBACK

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/257,688

(22) Filed: Feb. 26, 1999

(51) Int. Cl.[7] .............................. G06K 9/36; G06K 9/38; G06K 9/46
(52) U.S. Cl. ..................... 382/253; 382/211; 382/278
(58) Field of Search .................. 250/208.1; 348/414.1, 348/417.1, 418.1, 422.1; 356/457–458; 359/26, 29, 561; 375/240.22; 382/210, 211, 154, 209, 232, 239, 253, 278

(56) References Cited

U.S. PATENT DOCUMENTS 5,185,815 A * 2/1993 Brandstetter ................. 382/211
5,748,780 A * 5/1998 Stolfo ........................ 382/232

OTHER PUBLICATIONS

Yoshida et al., Optical computing techniques for image/video compression, Jun. 1994, pp. 948–954, Proceedings of the IEEE, vol. 82, Issue 6.*

Reif et al., Optical techniques for image compression, Mar. 24, 1992, pp. 32–41, IEEE, Data Compression Conf. DCC —92.*

Karim et al., Optical Computing, An Introduction, ISBN-0–471-52886–2, 1992, pp. 335–349.*

* cited by examiner

Primary Examiner—Timothy M. Johnson
(74) Attorney, Agent, or Firm—Nathan O. Jensen; Kyle Eppele

(57) ABSTRACT

A method and apparatus for compressing video data images uses optical processing techniques. The method and apparatus perform holographic optical correlation and apply holographic optical correlation in a feedback loop. A codebook of images or primitives for the correlation are stored in a holographic library.

10 Claims, 2 Drawing Sheets

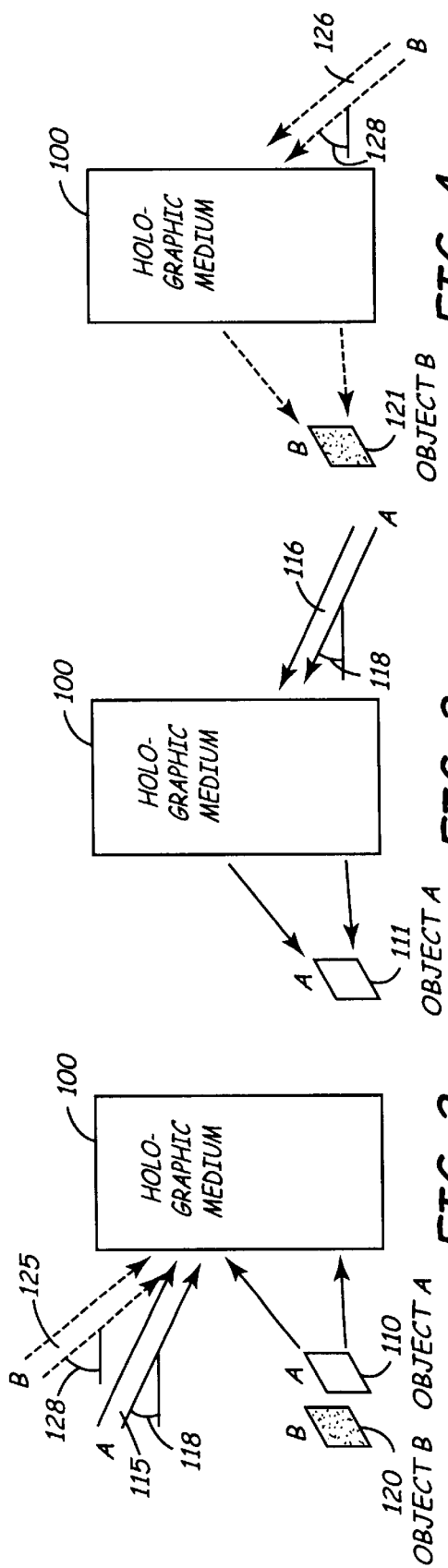
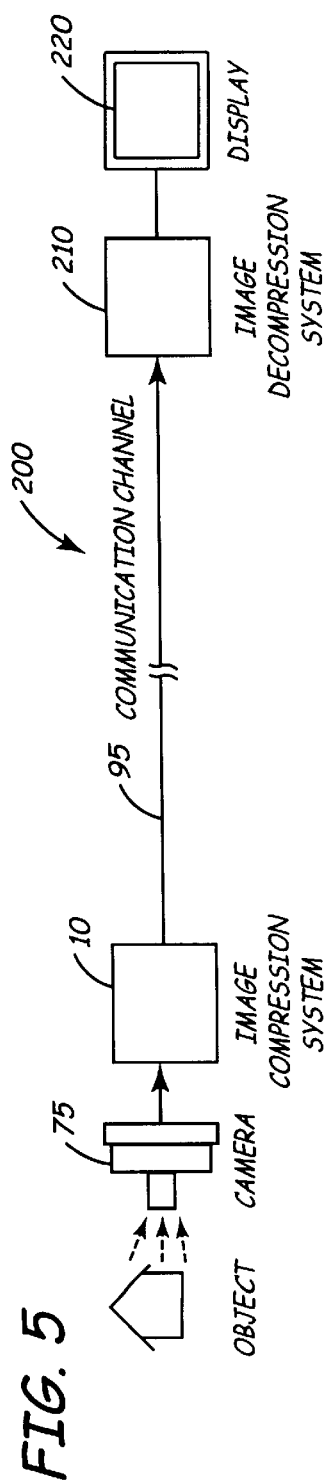

VIDEO DATA COMPRESSION PREPROCESSOR USING HOLOGRAPHIC OPTICAL CORRELATION AND FEEDBACK

FIELD OF THE INVENTION

This invention relates to the field of data compression. More particularly, this invention relates to the field of video image compression. More particularly still, this invention relates to the field of holographic optical correlation and the application of holographic optical correlation in a feedback loop to produce compression of video images.

BACKGROUND OF THE INVENTION

It is well known to take advantage of the speed and efficiency of computer hardware and algorithms to perform digital transforms for data compression of video images. However, analog transformation remains an important alternative to digital processing in certain applications. These applications may include optical computing, crystallography, interferometry, image acquisition, and image processing.

In many cases where the input image is accessible or available, operations such as convolution, smoothing, or image enhancement can be performed faster optically than digitally, and can take advantage of the distribution of information in the transformed domain.

A preferred method of transforming or compressing image data is the use of the Fourier transform of a real, two-dimensional input. A disadvantage of the Fourier transform is that a Fourier transform for transforming real two-dimensional inputs, is redundant. The Fourier transform encodes information in terms of both magnitude and phase over one-half of the output plane and repeats it in conjugate form over the other half. Recording devices such as photographic film, photo detectors, and photo diodes respond only to intensity and therefore half of the information contained in the transform is lost or unnecessary.

In applications where the transform phase is important, two broad classes of solutions have been used. In the first class of solutions phase is deduced from intensity-only records. For example, computer algorithms which transform from one domain to the other and back again can sometimes converge on a solution when constraints such as non-negativity and finite support are applied. In a second class of solutions, defracted radiation is modified so that the phase is encoded in the intensity, thereby rendering magnitude-only records sufficient for inverting the transform. Examples include phase contrast microscopy, the central dark ground method, and holography.

A major disadvantage of conventional digital image processing or digital image compression is that the computations for carrying out real-time video image processing or image compression are highly resource intensive when using conventional sequential digital processors, and places undesirable limits on achievable compression rates and image quality. The conventional digital processor carries out the computations in a serial manner, i.e., one computation after another. Although these computations are rapid and the speed and efficiency of computing hardware is a increasing everyday, so are the demands for real-time high resolution video signaling over limited bandwidth channels. Further, the number of computations required in a typical digital processing compression technique is proportional to the pixelation of the video image.

Thus, there is a need and desire for a method of carrying out video image processing and video image compression using holographic processing techniques. Holographic techniques gain the advantage of parallel processing of video images as opposed to the serial processing carried out in traditional digital image processing and digital image compression.

Further, there is a need and desire for a method and apparatus for image processing and image compression that relies on electro-optical systems to produce the image processing or image compression results, thereby taking advantage of the rapid processing speed inherent in optical processing techniques.

SUMMARY OF THE INVENTION

The present invention relates to a method of compressing data. The method includes resolving data into a coherent optical image, presenting the optical image to a holographic medium having stored images, determining a best match between the presented image/image component and the stored image components, the best match being a correlated image, and communicating data representative of the correlated image.

The present invention further relates to a system for compressing a video image. The system includes a processor, an image display coupled to the processor, and a holographic medium having a plurality of stored images. The holographic medium is in optical communication with the image display. Also, the system includes a detector array in optical communication with the holographic medium and an output register coupled to the detector array.

The present invention still further relates to a system for communicating data between two points. The system includes a data compression system, a communication channel coupled to the data compression system, and a data decompression system coupled to the communication channel. The data compression system includes a processor, an optical spatial light modulator (SLM) device coupled to the processor, a holographic medium in optical communication with the SLM, and a detection array in optical communication with the holographic medium.

BRIEF DESCRIPTION OF THE DRAWINGS

The invention will hereafter be described with reference to the accompanying drawings, wherein like reference numerals denote like elements in the various drawings, and:

FIG. 2 is a block diagram representation of a holographic crystal showing image storage in the holographic crystal;

FIG. 3 is a block diagram representation of the reconstruction of an object image A with an applied reference beam A;

FIG. 4 is a block diagram representation of the reconstruction of the object image B using an applied reference beam B; and FIG. 5 is a block diagram representation of a holographic image compression and communication system.

DETAILED DESCRIPTION OF THE PREFERRED EMBODIMENT

Figure 1:
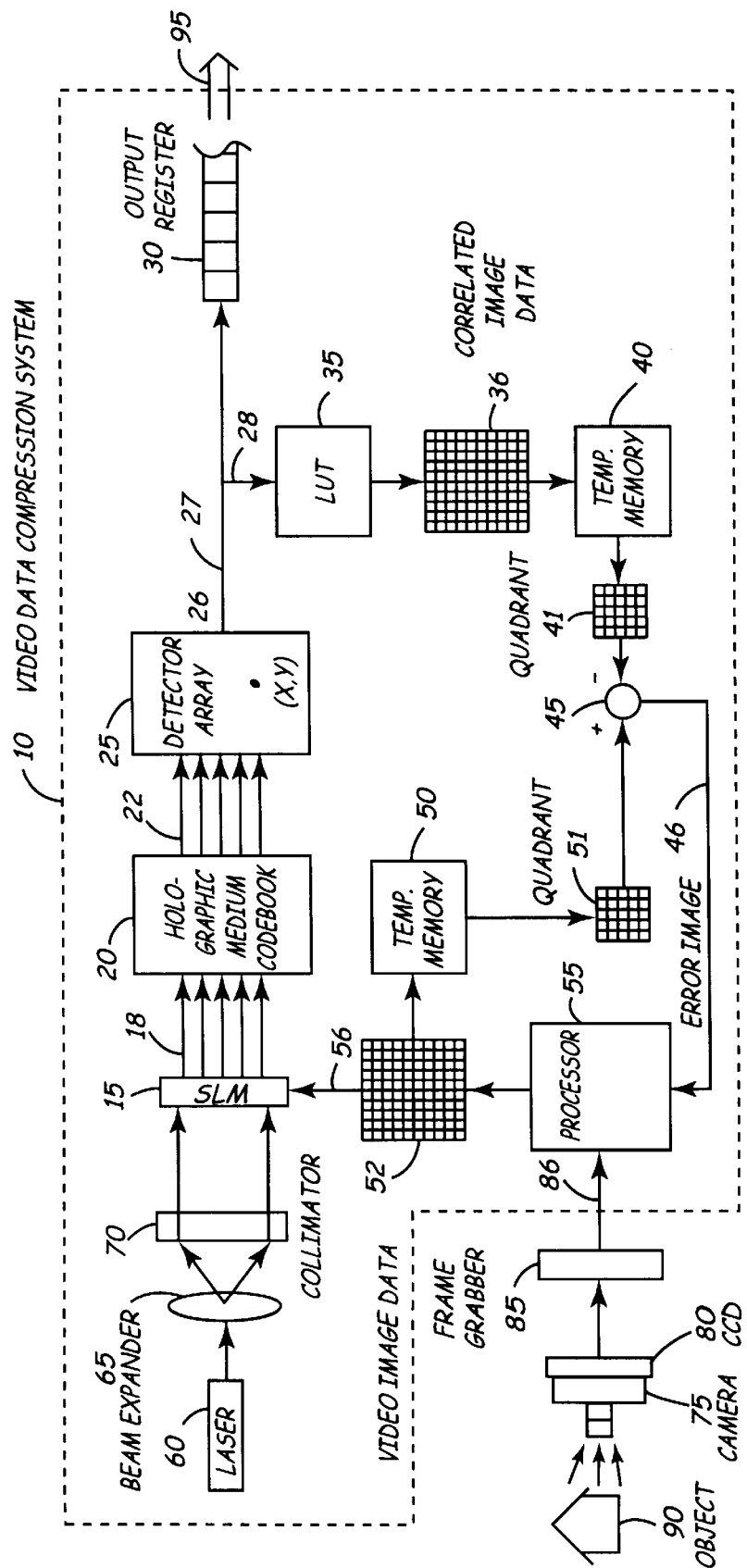
FIG. 1 is a block diagram of a holographic image compression system.

Referring to FIG. 1, a video data compression system 10 is depicted. Video data compression system 10 includes a display or spatial light modulator (SLM) 15, a holographic medium 20, a detector array 25, an output registry 30, a lookup table 35, a temporary memory 40, an adder 45, a temporary memory 50, a processor 55, a laser source 60, a beam expander 65, and a collimator 70. An image source, such as camera 75, having a charged coupled device (CCD) 80 and a frame grabber 85 can be attached to the data compression system in a preferred embodiment. The invention however is not limited to a connection with a video source such as camera 75, a memory, disc, video tape, etc., therefore other data streams may be used such as data from a computer, audio from a microphone, RADAR imagery, or any other data source.

In operation, camera 75 collects light reflected from object 90 and focuses that light on CCD 80. Charge coupled device 80 converts the light signals, focused by camera 75, into a digital signal. The digital signal is collected by a frame grabber 85. If for example, camera 75 is a video camera, CCD array 80 sends a continuous stream of digital data to frame grabber 80 and in a preferred embodiment frame grabber 80 takes an entire video frame of digital information at a rate of at least thirty frames per second. The digital frame information is image data that can be easily converted by a computer into a still video image. Image data is communicated to processor 55 along a communication channel 86.

Processor 55 manipulates the video image data into a computer usable format. Video image data is then communicated from processor 55 along a communication line 56 to spatial light modulator 15. Video image data 52 is also communicated to temporary memory 50.

Spatial light modulator 15 may be a liquid crystal display (LCD), an acousto-optic device (AOD), or a ferroelectric spatial light modulator. Laser source 60 shines a laser light through a beam expander 65 and a collimator 70. The dispersed laser light illuminates spatial light modulator 15. The illumination of spatial light modulator 15 and the input of image 52 into spatial light modulator 15 causes an optical output that is a coherent optical image 18. Spatial light modulator 15 presents the coherent optical image to holographic medium 20.

Holographic medium 20 is preferably an electro-optic crystal that operates on the photo reactive effect to store a holographic image in the holographic medium. Holographic medium 20 preferably stores a codebook of primitives or images. A hologram, in general, is typically formed by interfering two mutually coherent beams of light, one carrying spatial information and the other serving as a reference. After the hologram is exposed and developed, it may be illuminated with a reference beam resulting in accurate reconstruction of the object. If holographic medium 20 is a thick medium, a large number of different holograms may be recorded in the same volume by using angularly distinct reference beams. Holographic medium 20 can be made from a variety of materials including, but not limited to, ferroelectric crystals such as SBN (Strontium Barium Niobate), BaTiO$_3$ (Barium Titanite), and LiNbO$_3$ (Lithium Niobate).

Referring now to FIG. 2, a holographic medium 100 is depicted. FIG. 2 depicts the storage of two distinct primitives or objects, object A 110 and object B 120. In order to store object A 110, a reference beam of coherent light 115 is incident upon holographic medium 100 at a first angle 118, with the horizontal. When properly exposed, an image of object A 110 will be stored in holographic medium 100. Similarly object B 120 may also be stored in holographic medium 100 by exposing the object to holographic medium 100 with a reference beam 125 of coherent light that is incident upon holographic medium 100 at a second angle 128, with the horizontal. With proper exposure, an image of object B 120 is stored in holographic medium 100 along with an image of object A 110.

As shown in FIG. 3, the process of retrieving an image of object A 111 is depicted. A reference beam 116, of coherent light, having the same angle 118, with the horizontal, as reference beam A 115 shown in FIG. 2, is directed on holographic medium 100. When holographic medium 100 is exposed to reference beam A, as depicted, in FIG. 3, a holographic image of object A 111 is produced. Similarly, as depicted in FIG. 4, when a reference beam B 126 is incident upon holographic medium 100 at an angle 128, with the horizontal, a holographic image 121 is produced.

This same setup may be used to perform the function of correlating a given pattern against all of the stored patterns in holographic medium 100, by illuminating the holographic medium with a particular object beam or object image that is to be compared with the stored images. The result is the reconstruction of a set of reference beams, of which the strongest indicates the stored object to which the illuminated object is closest. The resultant reference beams are brought to a focus, yielding an array of spots whose relative optical powers can be detected and evaluated. The brightest spot indicates which stored object is closest to the presented object, presented object beam, or presented object image.

Referring again to FIG. 1, an image 18 is presented to holographic medium 20. Holographic medium 20 has a set of images stored within. In a preferred embodiment holographic medium 20 holds a fixed library or codebook of contrast and statistically pre-selected and optimized image transforms or image primitives. Holographic crystals have the potential to store tens of thousands of images in a single crystal. However, if an adequate codebook cannot be stored in a single crystal, multiple crystals with multiple detector arrays may be used in a parallel array of crystals and detectors.

Holographic medium 20 produces a set of reference beams 22, the set of reference beams being projected on a detector array 25. Because the reference beams emanate from holographic medium 100 at different angles, the reference beams each hit detector array 25 at different locations. Detector array 25 determines the coordinate 26 of the reference beam with the highest relative optical power (i.e., the brightest reference beam). Coordinate and intensity information 26 is communicated along the line 27 to an output register 30. Coordinate information 26 is also communicated along line 28 to a lookup table 35. Lookup table 35 contains a digitized version of all the image primitives stored in holographic medium 20 correlated with locations on detector array 25. Therefore, when lookup table 35 is presented with coordinate information 26 a digital data image 36 is output from lookup table 35. Digital data image 36 is communicated to a temporary memory 40.

A first pass of a full image through holographic medium 20 obtains a best match or crude approximation of the original image. Therefore, according to one embodiment it is preferable to refine the approximated image by feeding back the image error. Thus, in a preferred embodiment the image compression is a recursive process. During the first loop, the correlated data image 36 is broken down into a plurality of quadrants. In FIG. 1, correlated image 36 is broken into four quadrants (the present invention is not limited to four quadrants or to the specific divisions depicted). Similarly, data image 52 is broken down into four quadrants. From both temporary memories 40 and 50 a first of the four quadrants 41 and 51, respectively, are selected and communicated to adder 45 where an error image is created and communicated to processor 55 along line 46.

During a second through fourth recursive loop, the other three of the four quadrants are processed in the same manner. This processing of the four quadrants creates four new images to be output from lookup table 35 and to be stored in temporary memory 40. Therefore, during the next sixteen recursive loops those four images will be processed in a similar manner creating sixteen new images to be stored in temporary memory 40 and temporary memory 50. During this recursive processing, output register 30 is filled with pairs of (x,y) correlation coordinates so that the image can be decompressed at a later time or in a different location according to this string of (x,y) pairs.

In a preferred embodiment the recursive loops may be carried out as many times as can be accomplished in one thirtieth of a second, so that a video throughput rate of thirty frames per second can be maintained. Alternatively, any number of recursive loops can be used, limited by the refinement required, by the time available to complete the compression, by the capacity of the temporary memories to store an exponentially increasing number of digital images, by the size of the output register, or by the bandwidth of the communication channel.

In a preferred embodiment image 36 is sectioned into four quadrants for feedback. Alternatively, image 36 can be sectioned into any number or size of subdivision. Further, it may be advantageous to section areas near the center of the image more finely and areas near the edges of the image more coarsely.

As depicted in FIG. 5, image compression system 10 can be used in a data communication system 200 including a camera 75, an image compression system 10, a communication channel 95, an image decompression system 210, and a display 220. In operation, camera 75 communicates image data to image data compression system 10. Image data compression system 10 compresses the image data information such that it may be transmitted along a low bandwidth communication line 95. Communication line 95 is coupled with an image decompression system 210 having a data storage medium containing the same image primitives contained in holographic medium 20 of compression system 10. Image decompression system 210 decompresses the data communicated along communication line 95 into a format that may be displayed on a typical CRT or LCD display. The image decompression process is the reversal of the image compression process, that requires image addition rather than image differencing.

It is understood that while the detailed drawings and examples given describe preferred exemplary embodiments of the present invention, they are for the purposes of illustration only. The method and apparatus of the invention is not limited to the precise details and conditions disclosed. For example, the invention is not limited to the compression of video data, alternatively other data streams can be compressed, including audio data streams, or RF signals. Various changes may be made to the details disclosed without departing from the spirit of the invention, which is defined by the following claims.

What is claimed is:

1. A method of compressing data, the method comprising:

resolving input data into an optical image;

presenting the optical image to a holographic medium having a stored codebook of image primitives;

determining a best match between the presented optical image and the codebook of stored image primitives; and communicating data representative of the best match stored image primitives;

converting the data representative of the best match stored image primitive into a best match digital image;

subtracting the best match digital image from the input data to obtain a data error; and recursively returning to the resolving step with the data error.

2. The method of claim 1, further comprising stopping the recursion at a predetermined states.

3. The method of claim 2, wherein the recursions for compressing data occur in less than one thirtieth a second.

4. The method of claim 2, further comprising communicating the stored data to one of a storage device, a display device, and a communication channel.

5. The method of claim 4, further comprising storing the best match image and the presented image in a temporary memory.

6. The method of claim 5, further comprising sectioning the best match digital image and the input data, for each recursive sequence, into a plurality of data sections.

7. The method of claim 6, further comprising compressing each of the data sections by applying a single recursion thereto.

8. A system for compressing a video image comprising:

a processor;

a spatial light modulator coupled to the processor;

a holographic medium having a codebook of a plurality of stored images in optical communication with the spatial light modulator, wherein the spatial light modulator is an image display;

a detector array in optical communication with the holographic medium for determining a best match between an input image and the stored images;

an output register coupled to the detector array; and a recursion path connected between the output of the detector and the processor;

wherein the recursion path includes an image error generator for communicating image error to the processor; and wherein the error is the difference between the best match and the input image.

9. The system of claim 8, wherein the detector array is coupled with a look-up table, the look-up table being in the recursion path.

10. The system of claim 9, further comprising a video image capture device coupled to the processor.

* * * * *